US012097702B2

(12) United States Patent
Kikuchi et al.

(10) Patent No.: US 12,097,702 B2
(45) Date of Patent: Sep. 24, 2024

(54) INKJET HEAD

(71) Applicant: TOSHIBA TEC KABUSHIKI KAISHA, Tokyo (JP)

(72) Inventors: Noriyuki Kikuchi, Mishima Shizuoka (JP); Hiroki Ikegami, Sunto Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 125 days.

(21) Appl. No.: 17/827,184

(22) Filed: May 27, 2022

(65) Prior Publication Data

US 2023/0084935 A1 Mar. 16, 2023

(30) Foreign Application Priority Data

Sep. 15, 2021 (JP) ................................ 2021-150332

(51) Int. Cl.
*B41J 2/14* (2006.01)
*B41J 2/045* (2006.01)

(52) U.S. Cl.
CPC ....... *B41J 2/14209* (2013.01); *B41J 2/04516* (2013.01); *B41J 2/04581* (2013.01); *B41J 2/04588* (2013.01); *B41J 2/04596* (2013.01); *B41J 2/04598* (2013.01); *B41J 2/14201* (2013.01); *B41J 2/1433* (2013.01)

(58) Field of Classification Search
CPC ................ B41J 2/14209; B41J 2/04516; B41J 2/04581; B41J 2/04588; B41J 2/04596; B41J 2/04598; B41J 2/14201; B41J 2/1433
See application file for complete search history.

(56) References Cited

U.S. PATENT DOCUMENTS

| | | | | |
|---|---|---|---|---|
| 9,289,983 | B2 | 3/2016 | Nitta et al. | |
| 10,500,844 | B2 * | 12/2019 | Watanabe | ............ B41J 2/04573 |
| 2015/0328887 | A1 | 11/2015 | Nitta | |
| 2019/0091999 | A1 | 3/2019 | Watanabe | |

OTHER PUBLICATIONS

Extended European Search Report dated Dec. 19, 2022, mailed in counterpart European Application No. 22184691.8, 9 pages.

* cited by examiner

*Primary Examiner* — Geoffrey S Mruk
(74) *Attorney, Agent, or Firm* — Kim & Stewart LLP

(57) ABSTRACT

According to one embodiment, an inkjet head includes a pressure chamber for ink, a nozzle plate including a nozzle connected to the pressure chamber, an actuator to change a volume of the pressure chamber, and a drive circuit that drives the actuator. The drive circuit drives the actuator according to a drive waveform including an expansion waveform, a first weak contraction waveform, a contraction waveform, and a second weak contraction waveform.

14 Claims, 10 Drawing Sheets

| | 1Frame | 2Frame | 3Frame |
|---|---|---|---|
| 1Drop | | | (II) |
| 2Drop | | (II) | (II) |
| 3Drop | (I) | (II) | (II) |

INKJET HEAD

CROSS-REFERENCE TO RELATED APPLICATION

This application is based upon and claims the benefit of priority from Japanese Patent Application No. 2021-150332, filed Sep. 15, 2021, the entire contents of which are incorporated herein by reference.

FIELD

Embodiments described herein relate generally to an inkjet head and the ejection of liquids therefrom.

BACKGROUND

In the use of an inkjet head, small droplets called satellites, ink mists, or the like may be generated along with the main ink droplets (main droplets) that are ejected from the nozzles of the inkjet head. These small droplets cause deterioration of print quality. Therefore, there is a demand for the development of an inkjet head that suppresses the generation of these small droplets.

DETAILED DESCRIPTION

An object of certain example embodiments described herein is to provide an inkjet head that suppresses generation of small, unintended droplets such as satellite droplets and the like.

In general, according to one embodiment, an inkjet head includes a pressure chamber for ink, a nozzle plate including a nozzle for ejecting ink from the pressure chamber, and an actuator configured to change a volume of the pressure chamber. A drive circuit is configured to drive the actuator according to a drive waveform. The drive waveform includes an expansion portion that drives the actuator in an expansion direction expanding the volume of the pressure chamber; a first weak contraction portion after the expansion portion that drives the actuator in a contraction direction contracting the volume of the pressure chamber; a contraction portion after the first weak contraction portion that drives the actuator in the contraction direction by an amount greater than the first weak contraction portion; and a second weak contraction portion after the contraction portion that drives the actuator in the contraction direction by an amount less than the contraction portion.

Hereinafter, example embodiments will be described with reference to the drawings.

The examples use a piezo type inkjet head as an on-demand type inkjet head.

Figure 1:
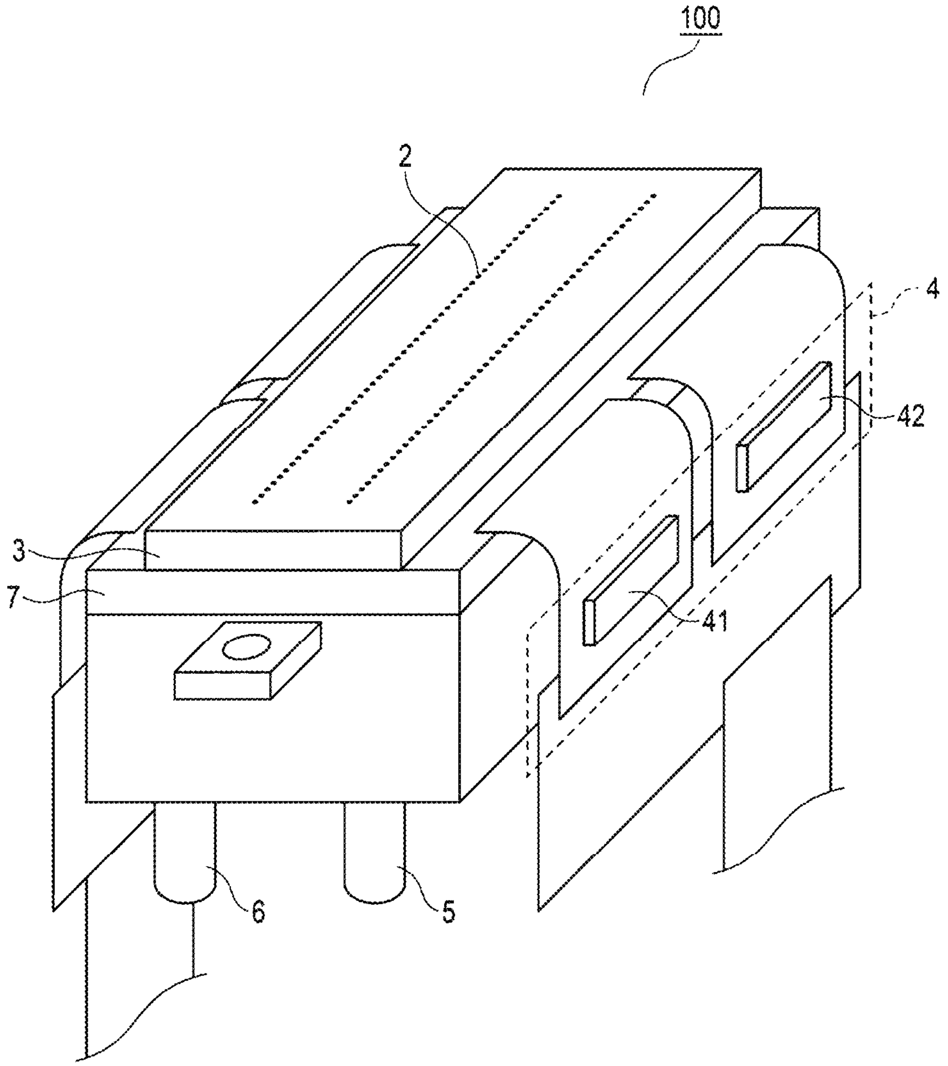
FIG. 1 is a perspective view illustrating an inkjet head according to an embodiment.

FIG. 1 is a perspective view illustrating a piezo-type inkjet head 100. The inkjet head 100 is of shared wall type. Hereinafter, the inkjet head 100 will be referred to as a head 100 for simplicity.

The head 100 includes a head main body 3 with a plurality of nozzles 2 for ejecting ink, a head driver 4 for generating a drive signal, and a manifold 7 with an ink supply port 5 and an ink discharge port 6. The head driver 4 includes two driver ICs (IC driver 41 and IC driver 42). Each of the driver ICs 41 and 42 has the same circuit configuration. Each of the driver ICs 41 and 42 includes a head drive circuit 101 which will be described below.

The head 100 ejects ink (which is supplied from the ink supply port 5) from the nozzle 2 in response to a drive signal generated by the head driver 4. Further, the head 100 discharges, from the ink discharge port 6, the ink that flows in from the ink supply port 5 but is not ejected from a nozzle 2.

Figure 2:
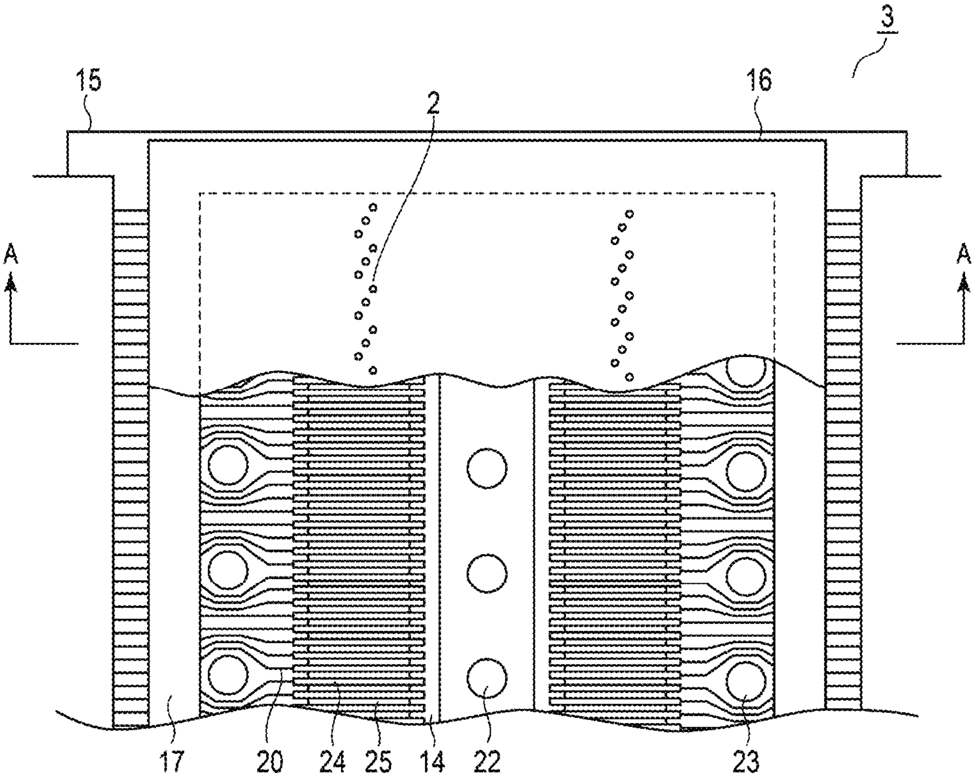
FIG. 2 is a plan view illustrating aspects of an inkjet head.
Figure 3:
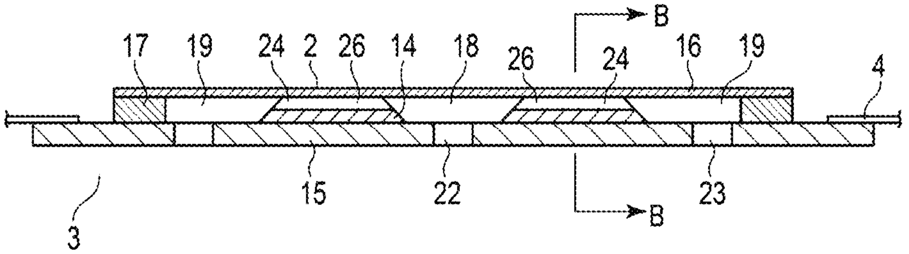
FIG. 3 is a view taken along line A-A of the inkjet head.

FIG. 2 is a plan view illustrating the head main body 3. FIG. 3 is a view taken along line A-A of the head main body 3 illustrated in FIG. 2, and FIG. 4 is a view taken along line B-B of the head main body 3 illustrated in FIG. 3.

As illustrated in FIG. 2, the head main body 3 includes a piezoelectric member 14, a base substrate 15, a nozzle plate 16, and a frame member 17. The head main body 3 begins with the base substrate 15. Then, the frame member 17 is joined onto the base substrate 15, and the piezoelectric member 14 is joined into the frame member 17. The nozzle plate 16 is adhered onto the frame member 17. Additionally, as illustrated in FIG. 3, a central space that is surrounded by portions of the base substrate 15, the piezoelectric member 14, and the nozzle plate 16 serves as an ink supply path 18. Additionally, in the head main body 3, a peripheral space surrounded by portions of the base substrate 15, the piezoelectric member 14, the frame member 17, and the nozzle plate 16 serves as an ink discharge path 19. In the nozzle plate 16, a plurality of nozzles 2 are formed in a repeating pattern or the like.

The base substrate 15 includes a hole 22 communicating with (connecting to) the ink supply path 18 and a hole 23 communicating with (connecting to) the ink discharge path 19. The hole 22 communicates with the ink supply port 5 through the manifold 7. The hole 23 communicates with (connects to) the ink discharge port 6 through the manifold 7.

Figure 4:
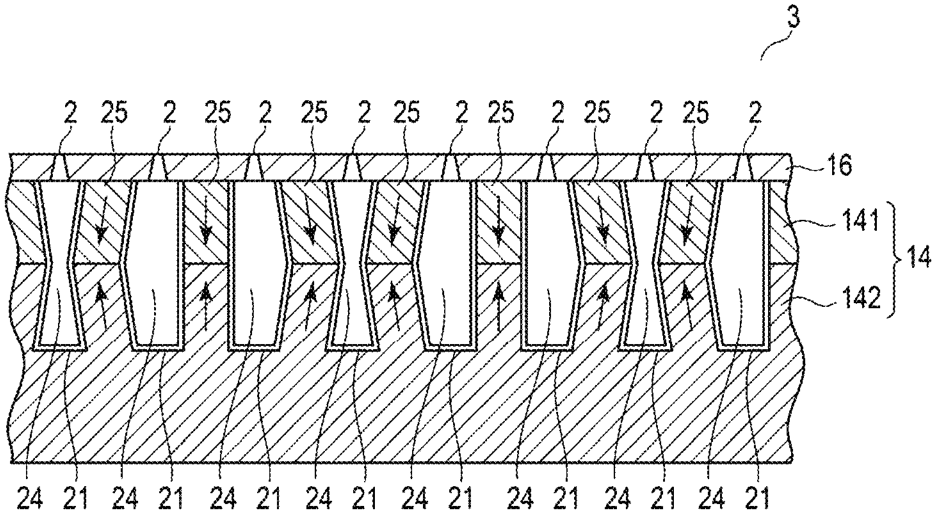
FIG. 4 is a view taken along line B-B of the inkjet head.

As illustrated in FIG. 4, in the piezoelectric member 14, a first piezoelectric member 141 and a second piezoelectric member 142 (having a polarity opposite to that of the first piezoelectric member 141) are stacked. The first piezoelectric member 141 and the second piezoelectric member 142 are adhered to each other.

As illustrated in FIG. 3, in the piezoelectric member 14, a plurality of elongated grooves 26 are formed in parallel.

The grooves 26 extend from the ink supply path 18 to the ink discharge path 19. Then, as illustrated in FIG. 4, electrodes 21 are arranged on inner surfaces of the grooves 26, respectively. As illustrated in FIG. 2, the electrodes 21 are connected to the head driver 4 through wirings 20, respectively. The spaces surrounded by each groove 26 and back surface of the nozzle plate 16 (which is adhered onto the second piezoelectric member 142 to cover the grooves 26) are pressure chambers 24, respectively. Additionally, the nozzles 2 each communicate with one of the pressure chambers 24 on a one-to-one basis.

As illustrated in FIG. 4, a portion of piezoelectric member 14 forms a partition wall between adjacent pressure chambers 24. The partition wall portion is interposed between the electrodes 21 of the respective adjacent pressure chambers 24. An actuator 25 is formed by the portion of the piezoelectric member 14 between the electrodes 21 on both sides thereof. When an electric field is applied according to the drive signal generated by the head drive circuit 101, the actuator 25 is shear deformed into a "<" or ">" shape with its ridge or apex portion corresponding to the joint point between the first piezoelectric member 141 and the second piezoelectric member 142. When the actuator 25 is deformed, the volume of the pressure chamber 24 is changed, and the ink inside the pressure chamber 24 can be pressurized. The pressurized ink is ejected from the nozzle 2 connected to the pressure chamber 24. That is, the head drive circuit 101 serves as a drive circuit for driving the actuator 25 for ejecting ink from a nozzle 2.

A grouping of components including a pressure chamber 24, the electrode 21 arranged in the pressure chamber 24, and the nozzle 2 of the pressure chamber 24 can be referred to as a channel. That is, the head 100 includes as many channels as there are pressure chambers 24. Hereinafter, a grouping of channels (e.g., a subset of the pressure chambers 24) can be referred to as a channel group 102 (see FIG. 6).

Next, the operating principle of the head 100 will be described with reference to FIGS. 5A to 5C.

Figure 5A:
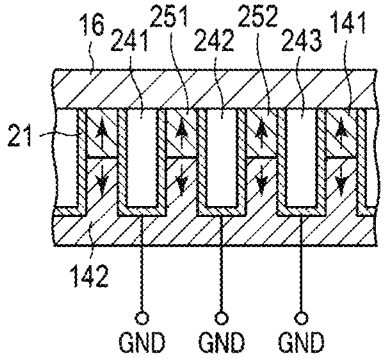
FIGS. 5A to 5C are diagrams provided to describe aspects related to the operating principle of an inkjet head.

FIG. 5A illustrates a state in which all potentials of the electrodes 21 arranged on the wall surfaces of a central pressure chamber 242 and adjacent pressure chambers 241 and 243 on both sides of the central pressure chamber 242 respectively have the ground potential GND. In this state, neither the actuator 251 interposed between the pressure chamber 241 and the pressure chamber 242, nor the actuator 252 interposed between the pressure chamber 242 and the pressure chamber 243 is subjected to any deforming action.

Figure 5B:
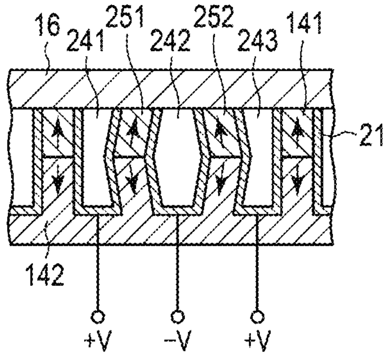

FIG. 5B illustrates a state in which a negative voltage ("−V") is applied to the electrode 21 of the central pressure chamber 242, and a positive voltage ("+V") is applied to the electrodes 21 of the adjacent pressure chambers 241 and 243. In this state, an electric field with a doubled net voltage acts on each of the actuators 251 and 252 in a direction orthogonal to the polarization direction of the piezoelectric members 141 and 142. By this action, each of the actuators 251 and 252 is deformed outward so as to expand the volume of the pressure chamber 242.

Figure 5C:
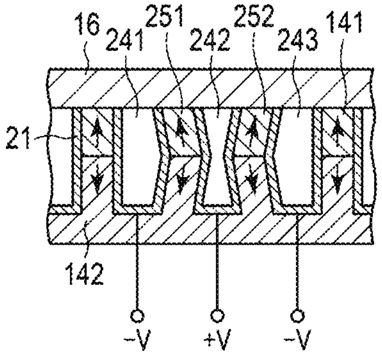

FIG. 5C illustrates a state in which a positive voltage ("+V") is applied to the electrode 21 of the central pressure chamber 242, and a negative voltage ("−V") is applied to the electrodes 21 of the adjacent pressure chambers 241 and 243. In this state, an electric field with a doubled net voltage acts on each of the actuators 251 and 252 in the direction opposite to that in FIG. 5B. By this action, each of the actuators 251 and 252 is deformed inward so as to contract the volume of the pressure chamber 242.

When the volume of the pressure chamber 242 is expanded or contracted, a pressure vibration is generated in the pressure chamber 242. By this pressure vibration, ink droplets can be ejected from the nozzle 2 communicating with the pressure chamber 242.

As described above, the actuator 251 that separates the pressure chamber 241 and the pressure chamber 242, and the actuator 252 that separates the pressure chamber 242 and the pressure chamber 243 apply the pressure vibration to the inside of the pressure chamber 242. That is, the pressure chamber 242 shares an actuator 25 with each of its adjacent pressure chambers 241 and 243. Therefore, the head drive circuit 101 cannot drive each of the pressure chambers 24 individually. In the head drive circuit 101, the pressure chambers 24 are thus divided into groups of (n+1) (where n can be any integer of 2 or more) for driving. The members of each group are separated from each other by n other pressure chambers 24 which are not members of the group. In this example embodiment, the pressure chambers 24 are divided into a group of three chambers, which are separated from each other by two non-group chambers, that is, the case of the so-called 3-division driving. The 3-division driving is just an example, and accordingly, the driving may be 4-division driving, 5-division driving, or the like.

Next, an inkjet printer 200 using the head 100 will be described. Hereinafter, the inkjet printer 200 will be referred to as a printer 200.

Figure 6:
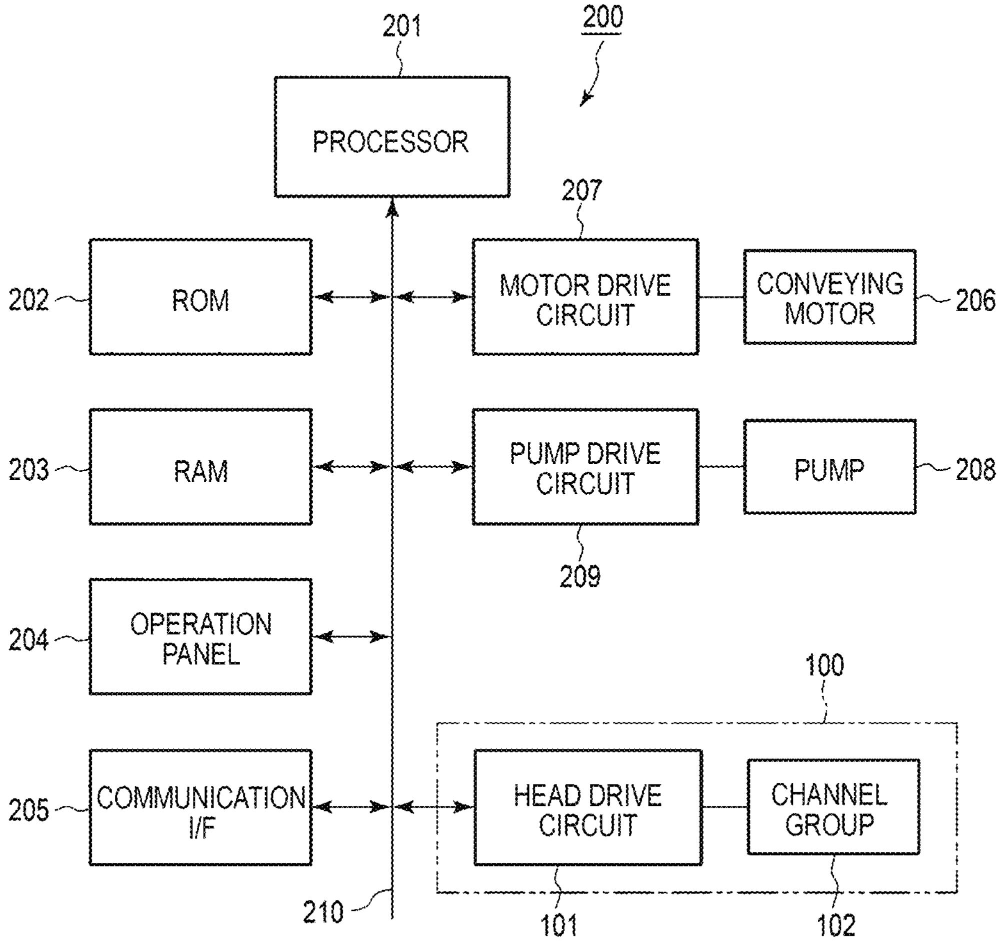
FIG. 6 is a block diagram illustrating a hardware configuration of an inkjet printer.

FIG. 6 is a block diagram illustrating the hardware configuration of the printer 200. The printer 200 includes a processor 201, a Read Only Memory (ROM) 202, a Random Access Memory (RAM) 203, an operation panel 204, a communication interface 205, a conveying motor 206, a motor drive circuit 207, a pump 208, a pump drive circuit 209, the head 100, and the like. Further, the printer 200 includes a bus line 210 such as an address bus and a data bus. The processor 201, the ROM 202, the RAM 203, the operation panel 204, the communication interface 205, the motor drive circuit 207, the pump drive circuit 209, the drive circuit 101 of the head 100 each connect to bus line 210 directly or through an input and output (I/O) circuit.

The processor 201 controls the other units and/or components to realize various functions of the printer 200 according to an operating system and/or an application program(s). The processor 201 is a central processing unit (CPU), for example.

The ROM 202 stores an operating system and/or an application program(s). The ROM 202 may store data necessary for the processor 201 to execute processes for controlling other units and/or components.

The RAM 203 stores data for the processor 201 to execute various processing. The RAM 203 is also used as a work area where information can be rewritten by the processor 201. The work area includes an image memory in which print data can be loaded.

The operation panel 204 includes an input operation unit and a display unit. The input operation unit can include various function keys such as a power key, a paper feed key, an error release key, and the like. The display unit can display status indicators and/or information indicating various operating states of the printer 200.

The communication interface 205 receives print data from a client terminal connected through a network such as Local Area Network (LAN) or the like. For example, if an error occurs in the printer 200, the communication interface 205 transmits a signal notifying the error to the client terminal.

The motor drive circuit 207 controls the driving of the conveying motor 206. The conveying motor 206 serves as a drive source for a conveyance mechanism that conveys a recording medium such as printer paper. Once the conveying motor 206 is activated, the conveyance mechanism starts to convey the recording medium. The conveyance mechanism conveys the recording medium to the printing position near the head 100. The conveyance mechanism eventually discharges the printed recording medium to the outside of the printer 200 from a discharge port.

The pump drive circuit 209 controls the driving of the pump 208. When the pump 208 is driven, ink from an ink tank or the like is supplied to the head 100.

The head drive circuit 101 drives a channel group 102 of the head 100 based on the print data.

Figure 7:
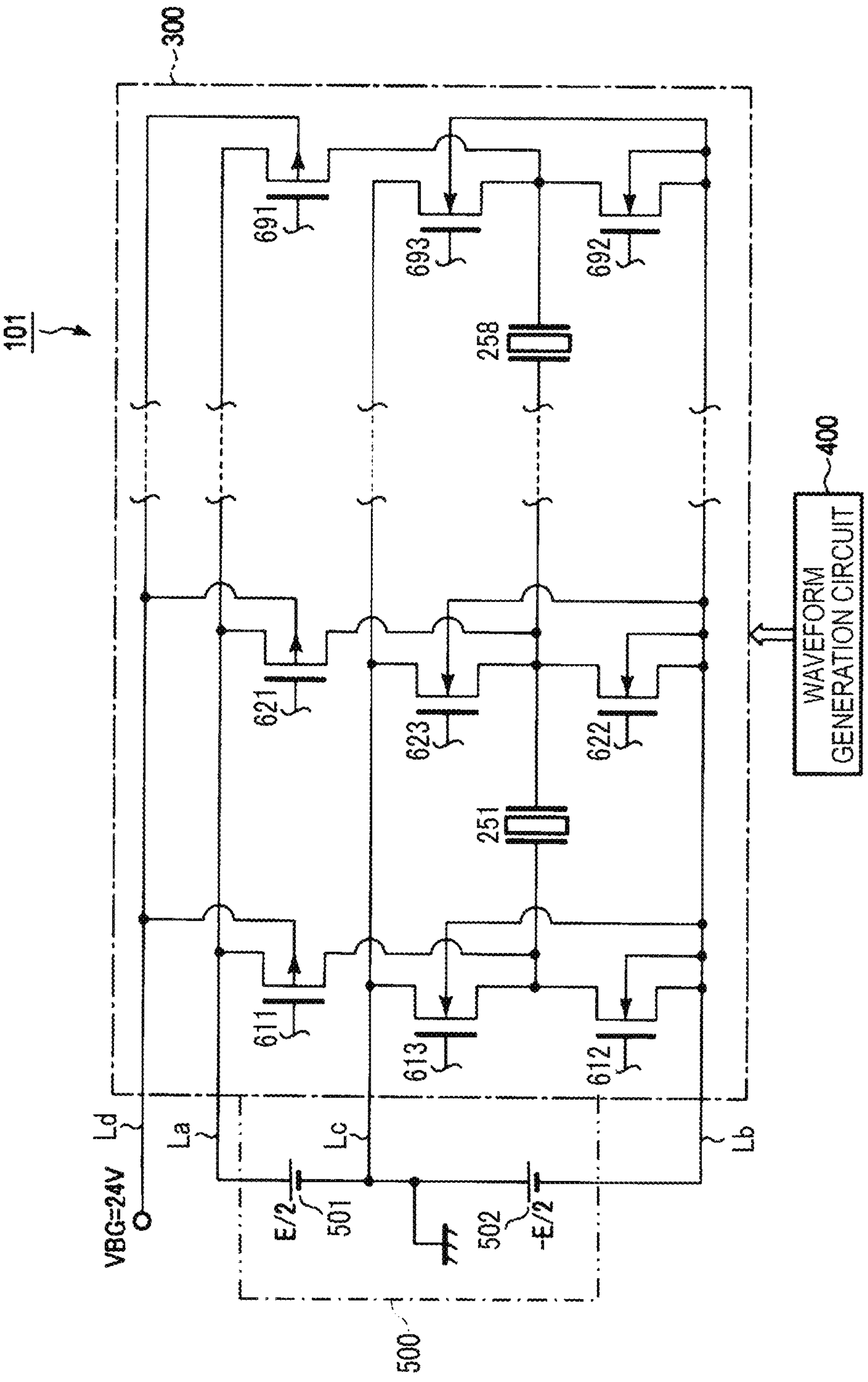
FIG. 7 is a diagram illustrating aspects of a circuit configuration of a head drive circuit in an inkjet printer.

FIG. 7 is a diagram illustrating aspects of a circuit configuration of the head drive circuit 101. The head drive circuit 101 includes a charge and discharge circuit 300, a waveform generation circuit 400, and a power supply circuit 500. The charge and discharge circuit 300 electrically connects the waveform generation circuit 400 and the power supply circuit 500. Note that in some examples the waveform generation circuit 400 and the power supply circuit 500 may be physically separated from the head 100 and electrically connected to the charge and discharge circuit 300.

In the power supply circuit 500, a first voltage source 501 and a second voltage source 502 are connected in series. Specifically, a negative electrode of the first voltage source 501 and a positive electrode of the second voltage source 502 are connected to each other and a connection point therebetween is grounded (zero V). Both the first voltage source 501 and the second voltage source 502 output a DC voltage E/2, which is half of the maximum voltage E, which is the charging target of the charge and discharge circuit 300. A power supply line La connected to a positive electrode of the first voltage source 501 is a positive power supply line at +E/2. A power supply line Lb connected to a negative electrode of the second voltage source 502 is a negative power supply line at −E/2. A power supply line Lc connected to the connection point between the negative electrode of the first voltage source 501 and the positive electrode of the second voltage source 502 is a ground line (zero V).

The charge and discharge circuit 300 is connected to the first voltage source 501 and the second voltage source 502 through the power supply line La, the power supply line Lb, and the power supply line Lc. The charge and discharge circuit 300 is also connected to a reference power supply VBG at +24V through a power supply line Ld.

In the charge and discharge circuit 300, a number of switch series circuits are connected between the positive power supply line La and the negative power supply line Lb. Specifically, in the charge and discharge circuit 300, a switch series circuit including a switch element 611 and a switch element 612, a switch series circuit including a switch element 621 and a switch element 622, . . . and a switch series circuit including a switch element 691 and a switch element 692 are connected between the positive power supply line La and the negative power supply line Lb.

Furthermore, a switch element 613, a switch element 623, . . . and a switch element 693 are connected respectively between a switch element interconnection point of each of the switch series circuits and the ground line Lc. The actuators 251, 252, . . . 258 are capacitive actuators including piezoelectric elements and are connected between the switch element interconnection points of adjacent switch series circuits.

Since the actuators (251, . . . 258) are connected between the switch element interconnection points of the adjacent switch series circuits, the total number of actuators is one less than the total number of the switch series circuits. The number of switch series circuits is not limited to nine as depicted in the figure, nor is the number of limited to eight.

The switch elements 611, 621, . . . 691 connected to the positive power supply line La are P-type channel MOS transistors. The switch elements 612, 622, . . . 692 connected to the negative power supply line Lb are N-type channel MOS transistors. Therefore, in the charge and discharge circuit 300, a large number of series circuits of the sources and drains of the P-type channel MOS transistors and the sources and drains of the N-type channel MOS transistors are connected between the positive power supply line La and the negative power supply line Lb.

The switch elements 613, 623, . . . 693 are N-type channel MOS transistors. Therefore, in the charge and discharge circuit 300, the sources and drains of the N-type channel MOS transistors are connected between the switch element interconnection point of each of the switch series circuits and the ground line Lc.

Back gates of the P-type channel MOS transistors (the switch elements 611, 621, . . . 691) are connected to a reference power supply line Ld of +24V. Back gates of the N-type channel MOS transistors (the switch elements 612, 622, . . . 692 and switch elements 613, 623, . . . 693) are connected to a negative power supply line Lb of −E/2. All the gates of the P-type channel MOS transistors (the switch elements 611, 621, . . . 691) and the gates of the N-type channel MOS transistors (the switch elements 612, 622, . . . 692 and switch elements 613, 623, . . . 693) are connected to the waveform generation circuit 400.

The waveform generation circuit 400 generates a control waveform for controlling on and off switching of each of these switch elements (611, 621, . . . 691; 612, 622, . . . 692; and 613, 623, . . . 693). Each of the switch elements is switched on and off according to the control waveform output from the waveform generation circuit 400. By switching on and off of these switch elements, each of the actuators 251, 252, . . . 258 can be charged and discharged.

In this example, the switch element 611, the switch element 612 and the switch element 613 on one side, and the switch element 621, the switch element 622 and the switch element 623 one the other, with the actuator 251 interposed therebetween, form an energization path for charging and discharging the actuator 251. Similarly, switch element 621, the switch element 622 and the switch element 623 on one side, and a switch element 631, a switch element 632 and a switch element 633 on the other, with the actuator 252 interposed therebetween, form an energization path for charging and discharging the actuator 252. The same applies to similarly the other actuators including actuator 258. Therefore, in the following, there will be a focus on the actuator 251 and the corresponding six switch elements 611, 612, 613, 621, 622, and 623 that form the energization path to the actuator 251 as representative of the operations of the other switch elements and actuators.

Figure 8:
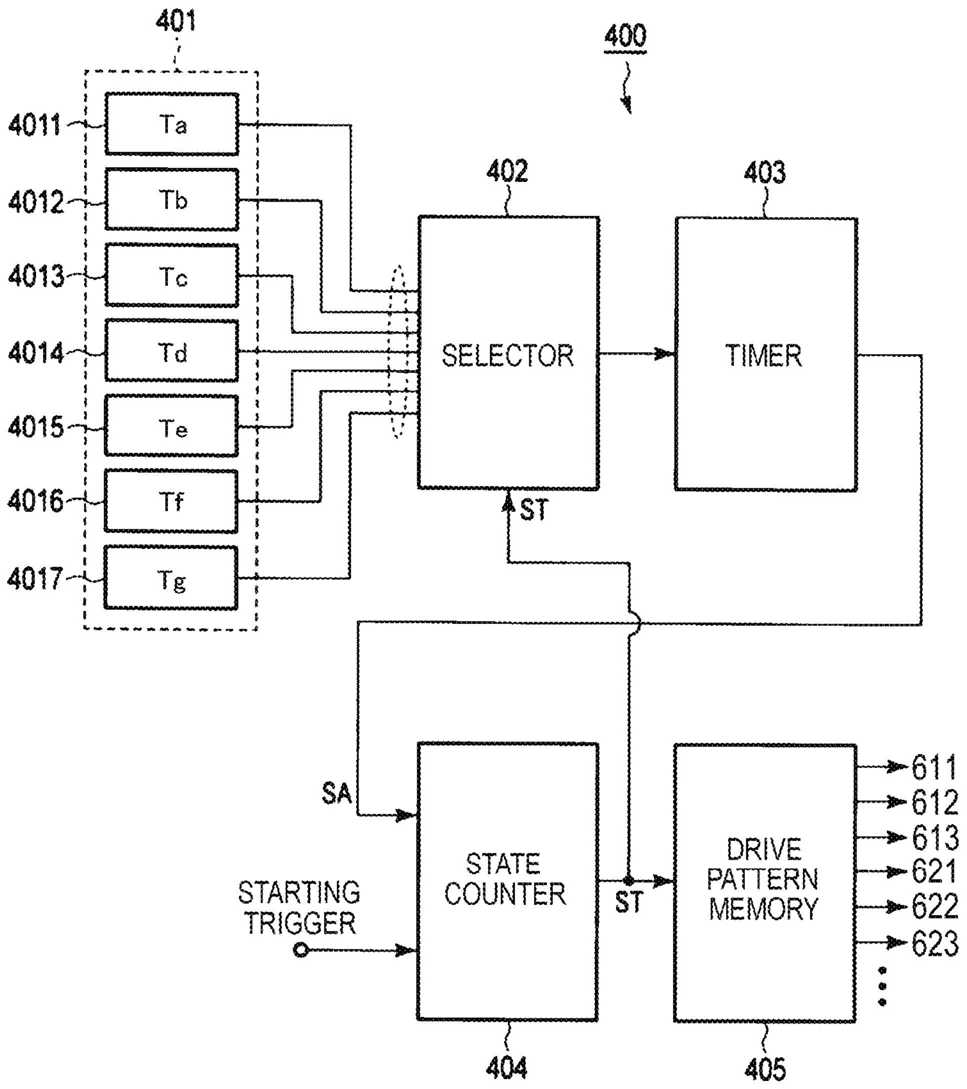
FIG. 8 is a block diagram illustrating aspects of a circuit configuration of a waveform generation circuit included in a head drive circuit.

FIG. 8 is a block diagram illustrating aspects of a circuit configuration of the waveform generation circuit 400. The waveform generation circuit 400 includes a time setting register 401, a selector 402, a timer 403, a state counter 404, and a drive pattern memory 405.

The time setting register 401 includes a first setting register 4011, a second setting register 4012, a third setting register 4013, a fourth setting register 4014, a fifth setting register 4015, a sixth setting register 4016, and a seventh setting register 4017. The value for time Ta is set in the first setting register 4011. The value for time Tb is set in the second setting register 4012. The value for time Tc is set in the third setting register 4013. The value for time Td is set in the fourth setting register 4014. The value for time Te is set in the fifth setting register 4015. The value for time Tf is set in the sixth setting register 4016. The value for time Tg is set in the seventh setting register 4017.

The selector 402 selects one of the time Ta, the time Tb, the time Tc, the time Td, the time Te, the time Tf, and the time Tg as set in the first to seventh setting registers 4011 to 4017 according to the state data ST output from the state counter 404. The selector 402 sets the selected time in the timer 403.

The timer 403 counts the time set by the selector 402. Then, when the set time is finished, the timer 403 outputs a state update signal SA to the state counter 404.

The state counter 404 is an octal counter, and in the initial state, the state data ST value is "0". In this initial state, if a trigger signal for starting waveform output is input from the printer 200, the state counter 404 increments the state data ST value by one. After that, each time the state update signal SA is received from the timer 403, the state counter 404 increments the state data ST value by one. Then, if the state data ST value has reached the upper limit value (seven here because the state counter 404 is an octal counter), the state counter 404 resets the state data ST back to "0" by transmission of the state update signal SA. The state counter 404 outputs the present state data ST value to the selector 402 and the drive pattern memory 405.

In the following description, the state data ST value in the initial state is referred to as state data Sta, the next state data ST value (incremented value) is state data STb, and so forth for subsequent (incremented) state data ST values of state data STc, STd, STe STf, STg, and STh.

The drive pattern memory 405 stores the drive pattern data in association with the state data STa to STh, respectively. The drive pattern data is data for controlling the on and off switching of the six switch elements 611, 612, 613, 621, 622, and 623 for the actuator 251. The drive pattern data is also data for controlling the on and off switching of the six switch elements 621, 622, 623, 631, 632, and 633 for the actuator 252.

Each time the state data STa to STh are sent from the state counter 404, the drive pattern memory 405 generates a drive waveform for controlling the switch elements 611, 612, 613, 621, 622, 623, and so on according to the drive pattern data corresponding to the state data STa to STh.

Figure 9:
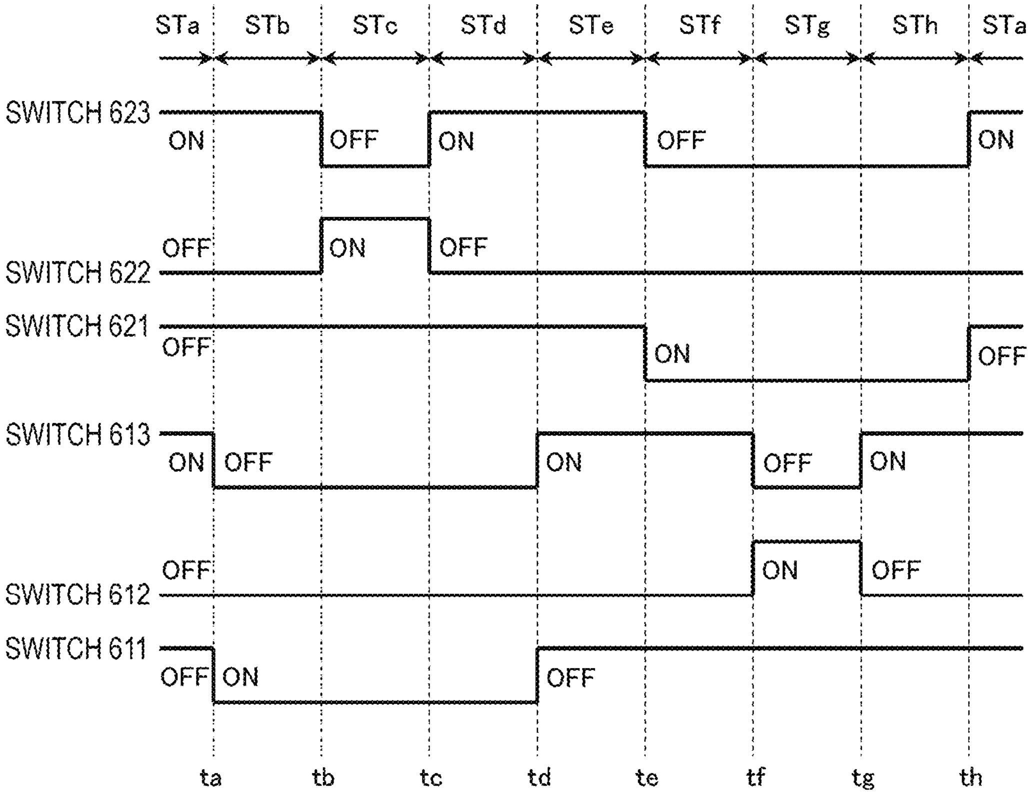
FIG. 9 is a diagram illustrating a correspondence relationship between state data and drive pattern data related to a waveform generation circuit.

FIG. 9 is a diagram illustrating the correspondence relationship between the state data STa to STh and the drive pattern data. In the initial state (state data Sta), the switch elements 623 and 613 are turned on, and the switch elements 621, 622, 611, and 612 are turned off.

In this initial state, if a trigger signal for starting waveform output is sent to the state counter 404 so the state data is updated from STa to STb (at time point ta), the switch element 613 is turned off and the switch element 611 is turned on by the drive waveform of the drive pattern data for the state data STb period from the drive pattern memory 405. At this time, a closed circuit including the first voltage source 501, the switch element 611, the actuator 251, and the switch element 623 is formed. As a result, the actuator 251 is energized and charged with a voltage E/2 (intermediate voltage E/2) in the forward direction.

As described above, the actuator 251 is charged with the electric charge with an intermediate voltage E/2, which is half of a maximum voltage E, by using the positive first voltage source 501. The maximum voltage E is the charging target value. The actuator 251 may be said to be "half-charged" at this point.

When the state data is updated from STa to STb, the selector 402 selects the first setting register 4011. As a result, the timer 403 times the time Ta. Then, when the time Ta has been timed and the timer 403 times out, the state data is updated from STb to STc.

When the state data is updated from STb to STc (at time point tb), the switch element 623 is turned off and the switch element 622 is turned on by the drive waveform of the drive pattern data corresponding to the state data STc. At this time, a closed circuit including the first voltage source 501, the switch element 611, the actuator 251, the switch element 622, and the second voltage source 502 is formed. As a result, the actuator 251 is energized and further charged to the maximum voltage E in the forward direction.

As described above, in the latter half of charging, the actuator 251 is charged to the maximum voltage E by using the positive first voltage source 501 and the negative second voltage source 502. The actuator 251 the actuator 251 is considered fully charged when charged to the maximum voltage E.

When the state data is updated from STb to STc, the selector 402 selects the second setting register 4012. As a result, the timer 403 times the time Tb. Then, when the time Tb has been timed and the timer 403 times out, the state data is updated from STc to STd.

When the state data is updated from STc to STd (at time point tc), the switch element 622 is turned off and the switch element 623 is turned on by the drive waveform of the drive pattern data corresponding to the state data STd. At this time, a closed circuit including the actuator 251, the switch element 611, the first voltage source 501, and the switch element 623, is formed. As a result, the actuator 251 is discharged.

As described above, in the first half of discharging, the electric charge is returned from the actuator 251 to the positive first voltage source 501, and the actuator 251 is discharged while the first voltage source 501 is charged.

When the state data is updated from STc to STd, the selector 402 selects the third setting register 4013. As a result, the timer 403 times the time Tc. Then, when the time Tc has been timed and the timer 403 times out, the state data is updated from STd to STe.

When the state data is updated from STd to STe (at time point td), the switch element 611 is turned off and the switch element 613 is turned on by the drive waveform of the drive pattern data corresponding to the state data STe. At this time, a closed circuit including the actuator 251, the switch element 613, and the switch element 623 is formed. As a result, the actuator 251 is further discharged.

As described above, in the latter half of discharging, the actuator 251 is fully discharged by forming a closed loop between the terminals of the actuator 251.

In the charging and discharging operation described above, the volume of a pressure chamber 24 is first expanded and ink is replenished (refilled into the pressure chamber), and the volume of the pressure chamber is then restored to its original (relaxed or steady) state. However, this operation causes a pressure vibration in the pressure chamber 24 by which ink droplets are ejected from the nozzle 2 associated with the pressure chamber 24. The ejection occurs at the time of discharging operation.

When the state data is updated from STd to STe, the selector 402 selects the fourth setting register 4014. As a result, the timer 403 times the time Td. Then, when the time Td has been timed and the timer 403 times out, the state data is updated from STe to STf.

When the state data is updated from STe to STf (at time point te), the switch element 623 is turned off and the switch element 621 is turned on by the drive waveform of the drive pattern data corresponding to the state data STf. At this time, a closed circuit including the first voltage source 501, the switch element 621, the actuator 251, and the switch element 613 is formed. As a result, the actuator 251 is energized and charged with intermediate voltage E/2 in the opposite direction.

As described above, in the first half of this "opposite charging," the actuator 251 is charged with electric charge in the opposite direction from the expansion operation to the intermediate voltage E/2, which is half of the maximum voltage E, by using the positive first voltage source 501.

When the state data is updated from STe to STf, the selector 402 selects the fifth setting register 4015. As a result, the timer 403 times the time Te. Then, when the time Te has been timed and the timer 403 times out, the state data is updated from STf to STg.

When the state data is updated from STf to STg (at time point tf), the switch element 613 is turned off and the switch element 612 is turned on by the drive waveform of the drive pattern data corresponding to the state data STg. At this time, a closed circuit including the first voltage source 501, the switch element 621, the actuator 251, the switch element 612, and the second voltage source 502 is formed. As a result, the actuator 251 is further charged to maximum voltage E in the opposite direction.

As described above, in the latter half of the opposite charging, the actuator 251 is fully charged to the maximum voltage E (but in the opposite direction from the expansion operation) by using the positive first voltage source 501 and the negative second voltage source 502.

When the state data is updated from STf to STg, the selector 402 selects the sixth setting register 4016. As a result, the timer 403 times the time Tf. Then, when the time Tf has been timed and the timer 403 times out, the state data is updated from STg to STh.

When the state data is updated from STg to STh (at time point tg), the switch element 612 is turned off and the switch element 613 is turned on by the drive waveform of the drive pattern data corresponding to the state data STh. At this time, a closed circuit including the actuator 251, the switch element 621, the first voltage source 501, and the switch element 613 is formed. As a result, the actuator 251 is discharged.

As described above, in the first half of discharging, the electric charge is returned from the actuator 251 to the positive first voltage source 501, and the actuator 251 is discharged while the first voltage source 501 is charged.

When the state data is updated from STg to STh, the selector 402 selects the seventh setting register 4017. As a result, the timer 403 times the time Tg. Then, when the time Tg has been timed and the timer 403 times out, the state data returns from STh to STa.

When the state data returns from STh to STa (at time point th), the switch element 621 is turned off and the switch element 623 is turned on by the drive waveform of the drive pattern data corresponding to the state data STa. At this time, a closed circuit including the actuator 251, the switch element 623, and the switch element 613 is formed. As a result, the actuator 251 is further discharged.

As described above, in the latter half of discharging, the actuator 251 is completely discharged by forming a closed loop between the terminals of the actuator 251.

By this opposite charging and discharging operation as described above, the volume of a pressure chamber 24 is contracted and then restored to its original state. By this operation, a residual vibration in the pressure chamber 24 can be canceled.

After this, each time a trigger signal for starting the waveform output is input to the state counter 404, the waveform generation circuit 400 executes the same operation again. By such an operation of the waveform generation circuit 400, the charge and discharge circuit 300 switches on and off the switch elements 611, 612, 613, 621, 622, and 623 forming the energization path to the actuator 251.

In this case, the electrode 21 of which applied voltage is controlled by switching on and off of the three switch elements 621, 622, and 623 is an electrode of one channel for ejecting ink (hereinafter referred to as ejection channel Ch.X). The electrode 21 of which applied voltage is controlled by switching on and off of the remaining three switch elements 611, 612, 613 is an electrode of a channel adjacent to the ejection channel Ch.X (hereinafter referred to as adjacent channel Ch.X-1). The actuator 251 is interposed between the electrode 21 of the ejection channel Ch.X and the electrode 21 of the adjacent channel Ch.X-1. Accordingly, the actuator 251 is driven by the difference between the voltage applied to the electrode 21 of the ejection channel Ch.X and the voltage applied to the electrode 21 of the adjacent channel Ch.X-1. By appropriately controlling the driving of the actuator 251, it is possible to eject 1 ink droplet from the nozzle 2 of the ejection channel Ch.X. As described above, the waveform that controls the driving of the actuator 251 is referred to as a drive waveform.

Figure 10:
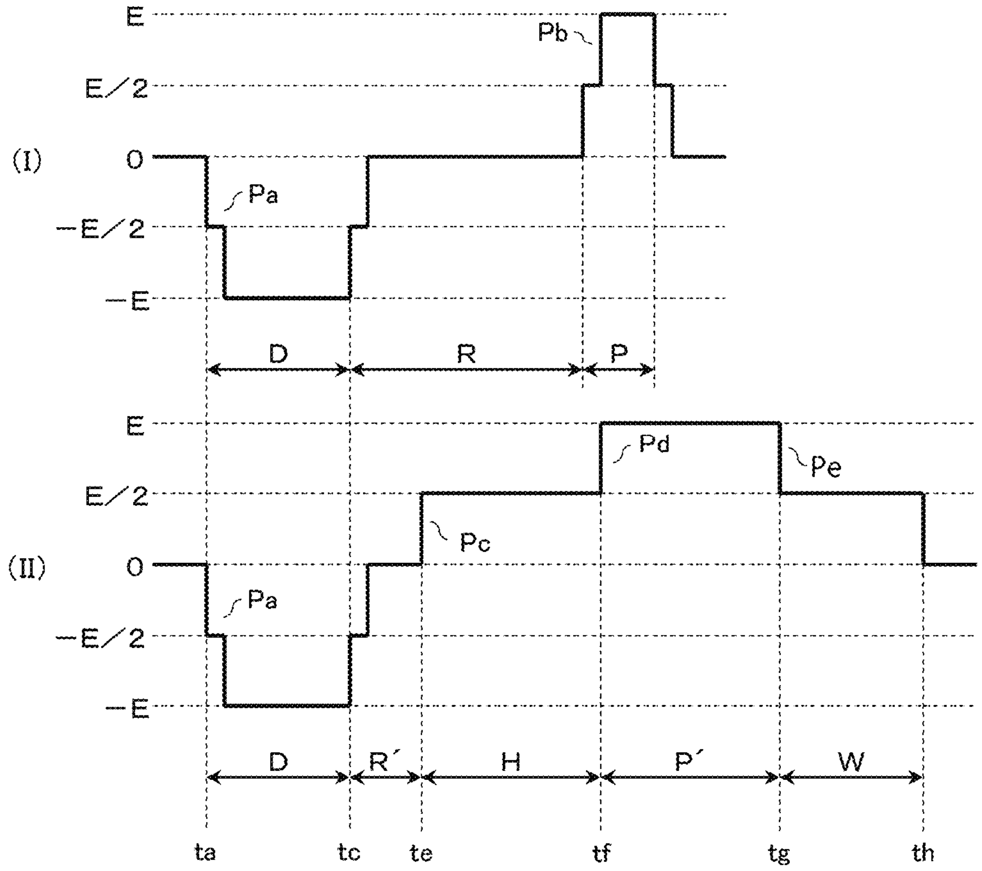
FIG. 10 is an explanatory diagram illustrating aspects of a drive waveform in an embodiment.

FIG. 10 is an explanatory diagram illustrating the drive waveform used in an embodiment. In this example, a first drive waveform (I) and a second drive waveform (II) are used.

The first drive waveform (I) includes an expansion waveform in time period D, a holding waveform in time period R, and a contraction waveform in time period P. For the expansion waveform, a first pulse Pa that changes from the steady state value ("0V") to a negative maximum voltage –E is applied to the actuator 251. By applying the first pulse Pa to the actuator 251, the actuator 251 is driven in the direction of expanding the pressure chamber 24 of the ejection channel Ch.X.

The expansion waveform returns towards the steady state value ("0V") after a time corresponding to the length of time period D elapses. As the voltage applied to the actuator 251 returns towards the steady state value, the actuator 251 is driven in the direction of restoring the pressure chamber 24 to its non-expanded state.

In time period D, the pressure chamber 24 of the ejection channel Ch.X is first expanded, maintained in this expanded state (expansion state), and then restored to its non-expanded (steady-state) state. By such a change in the volume of the pressure chamber 24, ink droplets are ejected from the nozzle 2 associated with the pressure chamber 24. In addition, if the time the expansion state of the pressure chamber 24 is maintained in time period D is set to be ½ of the pressure vibration cycle 2 AL (Acoustic Length) of the pressure chamber 24, the ink ejection volume reaches a maximum value. The time Dt may be adjusted by adjusting the time Ta set in the first setting register 4011 and/or the time Tb set in the second setting register 4012. The expansion waveform in time period D can be referred to as a compression pulse, an ejection pulse, or the like.

After the expansion waveform returns to the steady state value, the first drive waveform (I) becomes a holding waveform in time period R, which holds the steady state value ("0V") for the time corresponding to length of time period R. After the steady state value ("0V") is held, the first drive waveform (I) becomes a contraction waveform in time period P.

For the contraction waveform, a second pulse Pb that changes from 0V to a positive maximum voltage +E is applied to the actuator 251. By applying the second pulse Pb to the actuator 251, the actuator 251 is driven in the direction of contracting the pressure chamber 24 of the ejection channel Ch.X.

The contraction waveform becomes 0V after a time corresponding to time period P elapses. Once the voltage applied to the actuator 251 becomes the steady state value ("0V"), the actuator 251 can be driven in the direction of restoring the pressure chamber 24.

As described above, in time period P, the pressure chamber 24 of the ejection channel Ch.X is first contracted, maintained in the contraction state, and then restored. By such a volume change of the pressure chamber 24, the residual vibration of the pressure chamber 24 can be canceled. Specifically, by adjusting the time corresponding to the time period R of the holding waveform and the time corresponding to time period P of the contraction waveform to appropriate values, the residual vibration of the pressure chamber 24 is canceled at the trailing edge of the contraction waveform. The time Rt may be adjusted by adjusting the time Td set in the fourth setting register 4014. The time period P may be adjusted by adjusting the times Te, Tf, and Tg set in the fifth setting register 4015, the sixth setting register 4016, and the seventh setting register 4017. Here, the contraction waveform of time period P is referred to as a contraction pulse, a cancel pulse, or the like.

As described above, the first drive waveform (I) can cancel the residual vibration of the pressure chamber 24 in the ejection channel Ch.X, so that good ejection efficiency can be obtained. In addition, the landing performance of ink droplets is also excellent.

However, in the head 100, usually, if the ink droplet is ejected from the nozzle 2, the ink droplet is ejected from the nozzle 2 with a tail behind. Then, at the time the ink droplet separates from the ink in the nozzle 2, this tailing part, or the so-called liquid column becomes a spherical satellite and flies following the main ink droplet (main droplet). Since this satellite is a minute droplet, its flight speed is slower than that of the main ink droplet. For this reason, the satellite may land on the recording medium apart from the main ink droplet, causing deterioration of print quality such as density unevenness and ghost. In addition, some satellites stall and float in the printer 200, which is a so-called ink mist. If the ink mist adheres to the head 100 or surrounding circuit members and the like, it may cause a malfunction of the printer 200. The first drive waveform (I) cannot suppress the generation of small droplets such as the satellites and the ink mist described above.

The second drive waveform (II) includes an expansion waveform in time period D, a holding waveform in time period R', a first weak contraction waveform in time period H, a contraction waveform in time period P', and a second contraction waveform in time period W. The expansion waveform in the second drive waveform (II) can be the same as the expansion waveform of the first drive waveform (I). That is, for the expansion waveform, a first pulse Pa that changes from the steady state value of 0V to the negative maximum voltage −E is applied to the actuator 251, and when the time corresponding to time period D elapses, it returns to the steady state of 0V.

Also in the second drive waveform (II), in time period D, the pressure chamber 24 of the ejection channel Ch.X is first expanded, maintained in the expansion state, and then restored. By such a change in the volume of the pressure chamber 24, ink droplets are ejected from the nozzle 2 communicating with the pressure chamber 24. In addition, when the time period D (time the expansion state of the pressure chamber 24 is maintained) is ½ of the pressure vibration cycle 2 AL of the pressure chamber 24, the ink ejection volume reaches the maximum.

If the expansion waveform becomes the steady state value of 0V, the second drive waveform (II) becomes a holding waveform. The holding waveform holds the steady state value of 0V for a time corresponding to time period R'. When time period R' of the holding waveform ends, the second drive waveform (II) becomes the first weak contraction waveform.

For the first weak contraction waveform, a third pulse Pc that changes from the steady state value of 0V to an intermediate voltage +E/2 is applied to the actuator 251. By applying the third pulse Pc to the actuator 251, the actuator 251 is driven in the direction of contracting the pressure chamber 24 of the ejection channel Ch.X. However, the degree of contraction is smaller than the degree of contraction of the pressure chamber 24 by the second pulse Pb of the first drive waveform (I). Hereinafter, the degree of contraction of the pressure chamber 24 by the third pulse Pc is referred to as a weak contraction, and this state of weak contraction is referred to as a weak contraction state.

When the time corresponding to time period H of the weak contraction waveform elapses, the second drive waveform (II) becomes a contraction waveform. For the contraction waveform, a fourth pulse Pd that changes from the intermediate voltage +E/2 to the positive maximum voltage +E is applied to the actuator 251. By applying the fourth pulse Pd to the actuator 251, the actuator 251 is driven in the direction of further contracting the pressure chamber 24 of the ejection channel Ch.X. The degree of contraction is equal to the degree of contraction of the pressure chamber 24 by the second pulse Pb of the first drive waveform (I).

When the time corresponding to time period P' of the contraction waveform elapses, the second drive waveform (II) becomes a second weak contraction waveform. For the second weak contraction waveform, a fifth pulse Pe that changes from the maximum voltage +E to the intermediate voltage +E/2 is applied to the actuator 251. By applying the fifth pulse Pe to the actuator 251, the actuator 251 is driven in the direction of restoring the pressure chamber 24 of the ejection channel Ch.X. However, the pressure chamber 24 is not completely restored. If the voltage applied to the actuator 251 becomes the intermediate voltage +E/2, the pressure chamber 24 becomes a weak contraction state.

When a time corresponding to time period W of the second weak contraction waveform elapses, the second drive waveform (II) becomes the steady state value of 0V. If the voltage applied to the actuator 251 becomes the steady state value 0V, the pressure chamber 24, which is in the weak contraction state, is completely restored.

The second drive waveform (II) can suppress the generation of small droplets such as satellites, ink mists, and the like. Specifically, the time corresponding to time period R' of the holding waveform, the time corresponding to time period H of the first weak contraction waveform, the time corresponding to time period P' of a strong contraction waveform and the time corresponding to time period W of the second weak contraction waveform are adjusted to appropriate values. By doing so, the generation of small droplets called satellites, ink mists, and the like can be suppressed. The time of time period R' may be adjusted by adjusting the time Td set in the fourth setting register 4014. The time of the time period H may be adjusted by adjusting the time Te set in the fifth setting register 4015. The time of the time period P' may be adjusted by adjusting the time Tf set in the sixth setting register 4016. The time of the time period W may be adjusted by adjusting the time Tg set in the seventh setting register 4017.

Next, the setting of appropriate values for various time periods of the second drive waveform (II) will be described.

The length of time period D (time Dt) is the time from time point ta to time point tc.

The length of time period R' (time R't) is the time from the time point tc (at the starting of discharge of the actuator 251 that has been charged with the negative maximum voltage −E by the first pulse Pa) to the time point te (at the starting of charging the actuator 25 with the intermediate voltage E/2 by the third pulse Pc).

The length of time period H (time Ht) is the time from the time point te (at the starting of charging the actuator 25 with the intermediate voltage E/2 by the third pulse Pc) to the time point tf (at the starting of charging the actuator 25 with the positive maximum voltage +E by the fourth pulse Pd).

The length of time period P' (time P't) is the time from the time point tf (at the starting of charging the actuator 25 with the positive maximum voltage +E by the fourth pulse Pd) to the time point tg (at the starting of discharge of the actuator 25 by the fifth pulse Pe).

The length of time period W (time Wt) is the time from the time point tg (at the starting of discharge of the actuator 25 by the fifth pulse Pe) to the time point th (at the completing of the discharging).

By setting these time values according to the relationship of Equations (1) to (3) below, it is possible to suppress the generation of small droplets called satellites, ink mists, and the like.

$$R't+Ht=Rt+(0.4 \text{ to } 0.6) \quad \text{Equation (1)}$$

$$Wt=Dt+(-0.5 \text{ to } 0.5) \quad \text{Equation (2)}$$

$$P't=4*Dt-(R't+Ht)-Wt \quad \text{Equation (3)}$$

Equation (1) can be expressed in different notation as: Rt+0.4≤(R't+Ht)≤Rt+0.6. Equation (2) can be expressed in different notation as: Dt−0.5≤Wt≤Dt+0.5.

In Equation (1), the variable Rt is a time corresponding to the length of time period R of the holding waveform in the first drive waveform (I). The sum total time of the time R't and the time Ht is obtained by adding a value of 0.4 μs to 0.6 μs to the time Rt. The time Wt is a value obtained by adding between −0.5 μs to 0.5 μs to the time Dt corresponding to time period D of the expansion waveform. The time P't is the time obtained by subtracting the time Wt and the sum of time R't and time Ht from four times the value of time Dt.

Figures 11, 12:
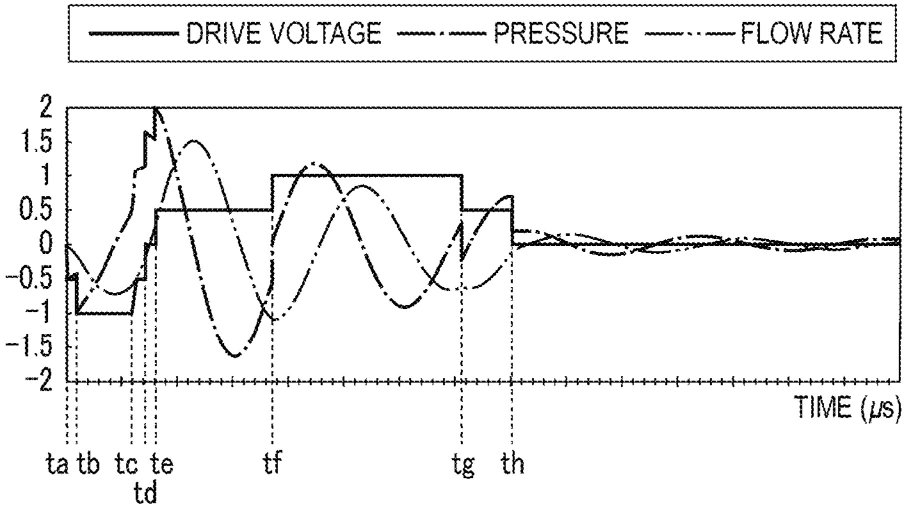
FIG. 11 is a timing diagram illustrating a drive waveform, a pressure waveform in a pressure chamber, and an ink flow rate waveform.
FIG. 12 is an explanatory diagram illustrating a drive waveform used when forming one dot with 1 to 3 drops.

FIG. 11 is a timing diagram illustrating the pressure waveform of the pressure chamber 24 and the flow rate waveform of the ink in the ejection channel Ch.X, if the second drive waveform (II) is applied to the actuator 251, where the total time of time R't and time Ht is time Rt+0.5 μs, and the time Wt is time Dt+0.1 μs. In FIG. 11, the solid line "Drive Voltage" represents the voltage waveform of the second drive waveform (II). The alternate long and short dash line "Pressure" represents a pressure waveform generated in the pressure chamber 24. The alternate long and two short dash line "Flow Rate" represents a flow rate waveform of the ink flowing into the nozzle 2. The horizontal axis represents the passage of time (μs). The vertical axis represents the drive voltage, pressure, flow rate and size of waveform, in which the numerical values are normalized.

As illustrated in FIG. 11, the pressure in the pressure chamber 24, which is decreased by the expansion of the pressure chamber 24 at the leading edge (first pulse Pa) of the expansion waveform in the second drive waveform (II) between the time point to and the time point tb, is increased while the expansion state is maintained. Then, if the pressure chamber 24 is restored at the trailing edge of the expansion waveforms between the time point tc and the time point td, the pressure is increased sharply. As a result, ink droplets are ejected from the nozzle 2 communicating with the pressure chamber 24.

After the ink droplets are ejected, the pressure reaches a positive peak value at the time point to of the leading edge (third pulse Pc) of the first weak contraction waveform in the second drive waveform (II). The pressure is decreased from the positive peak value while the pressure chamber 24 is maintained in the weak contraction state, changes to negative pressure, reaches a negative peak value, and then increased. Then, the pressure changes to the positive pressure at the time tf of the leading edge (fourth pulse Pd) of the contraction waveform in the second drive waveform (II). The pressure changed to the positive pressure reaches the second positive peak value while the pressure chamber 24 is maintained in the contraction state, and then decreased again and changed to the negative pressure. Then, the pressure at the second negative peak value is increased again and changes to the positive pressure. The pressure, which is the positive pressure, changes to the negative pressure at the time point tg of the leading edge (fifth pulse Pe) of the second weak contraction waveform in the second drive waveform (II). The pressure, which is the negative pressure, is increased while the pressure chamber 24 is maintained in the weak contraction state, and changes back to the positive pressure.

The flow rate of the ink flowing into the nozzle 2 has a positive peak value after the ink droplets are ejected. After that, the flow rate decreases and reaches a negative peak value at the time tf of the leading edge (fourth pulse Pd) of the contraction waveform in the second drive waveform (II). Upon reaching the negative peak value, the flow rate changes to increase and reaches a second positive peak value while the pressure chamber 24 is maintained in the contraction state, after which the flow rate decreases again and reaches a second negative peak value at the time point tg of the leading edge (fifth pulse Pe) of the second weak contraction waveform in the second drive waveform (II). When reaching the negative peak value, the flow rate starts to increase. Then, at the time point th if the flow rate becomes zero, that is, at the time point th when discharging the actuator 25 is completed, the pressure chamber 24 is completely restored from the weak contraction state. At this time, the pressure in the pressure chamber 24, which is the positive pressure, decreases and becomes substantially zero.

As described above, for the second drive waveform (II), the pressure chamber 24 after ejecting the ink droplet is maintained in the weak contraction state for the time Ht. Furthermore, in order to cancel the residual vibration of the pressure chamber, after the pressure chamber 24 is changed to the contraction state, the weak contraction state is maintained for the time Wt. By such a change of state in the pressure chamber 24, the meniscus of the ink is increased to the extent that the ink droplets are not ejected from the nozzle 2 communicating with the pressure chamber 24. This increase of the meniscus shortens the tailing, which is the main cause of satellite generation. As a result, the generation of small droplets to become satellites or ink mists is suppressed. Further, the residual vibration of the pressure chamber 24 is also canceled by restoring the state of the pressure chamber 24 from the contraction state. Thus, by using the second drive waveform (II) as the drive waveform for controlling the driving of the actuator 25, it is possible to suppress the generation of small droplets while suppressing the residual vibration. As a result, there is no concern that the satellite lands on the recording medium, causing deterioration of print quality such as density unevenness and ghost, or that ink mist adheres to the head 100 and circuit members therearound, causing a malfunction of the printer 200.

However, the second drive waveform (II) has a longer waveform length compared to the first drive waveform (I). For this reason, if gradation printing is performed by a multi-drop method in which 1 dot is formed with a plurality of continuously ejected ink droplets (drops), ejecting all ink droplets according to the second drive waveform (II) will take time to form 1 dot, causing a concern that the drive frequency may be affected.

Therefore, in the case of the multi-drop method, the ink droplets ejected according to the first drive waveform (I) and the ink droplets ejected according to the second drive waveform (II) are combined to form 1 dot. As an example, a combination of drive waveforms for a multi-drop method with a maximum of 3 drops will be described with reference to FIG. 12.

FIG. 12 illustrates a matrix-format data table in which the columns denote the number of drops and the rows denote the frame numbers. Since there are a maximum of 3 drops, the number of drops includes 3 types including “1 drop”, “2 drop”, and “3 drop”. The frame number includes “1 frame” indicating the first drop of 3 drops, “2 frame” indicating the second drop of 3 drops, and “3 frame” indicating the third drop of 3 drops.

If 1 dot is formed by 1 drop, that is, in the case of “1 drop”, the 1 drop corresponds to “3 frame” which is the third drop in 3 drops. In the present embodiment, the ink droplet of “3 frame” is ejected according to the second drive waveform (II).

If 1 dot is formed by 2 drops, that is, in the case of “2 drop”, the first drop corresponds to the “2 frame” which is the second drop in the 3 drops, and the second drop corresponds to the “3 frame” which is the third drop in the 3 drops. In an embodiment, the ink droplet of “2 frames” and the ink droplet of “3 frames” are ejected according to the second drive waveform (II), respectively. As described above, even if all the 2 drops are ejected according to the second drive waveform (II), the time required for forming 1 dot does not affect the drive frequency.

If 1 dot is formed with 3 drops, that is, in the case of “3 drop”, the ink droplet of “1 frame” which is the first drop is ejected according to the first drive waveform (I). The ink droplets of the “2 frame” which is the second drop and the “3 frame” which is the third drop are ejected according to the second drive waveform (II), respectively. Even if the first drop is ejected according to the first drive waveform (I), the satellites generated by the ejection are extremely small as compared with the case where all 3 drops are ejected according to the first drive waveform (I). In addition, the ink mist may adhere to the ink droplets of the second drop or the third drop and land on the recording medium. Therefore, the print quality does not deteriorate. Moreover, the time required to form 1 dot can be reduced to such an extent that the drive frequency is not affected.

Figure 13:
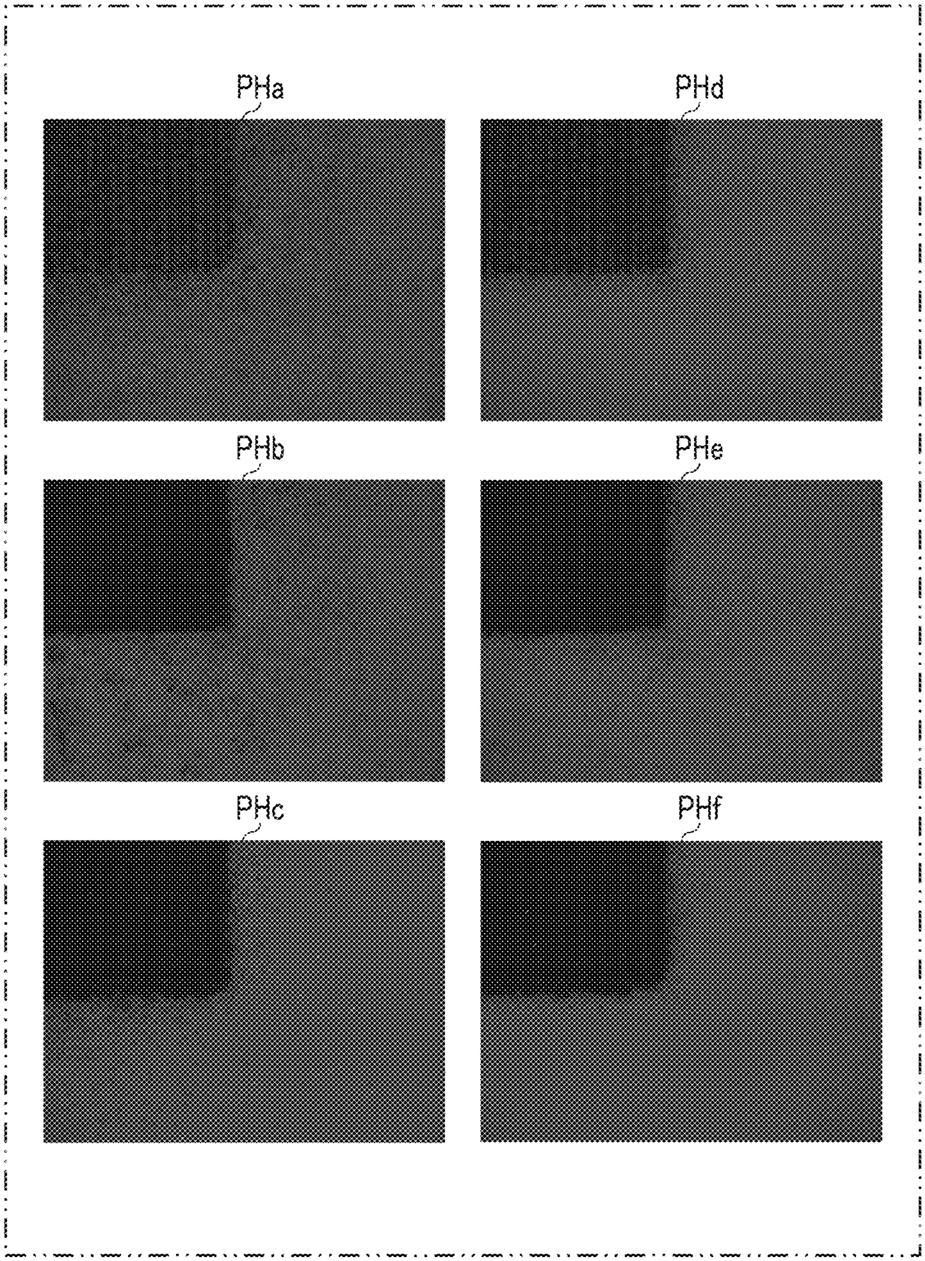
FIG. 13 depicts aspects related to a flying state of ink according to an embodiment.

FIG. 13 shows results related to a flying state of ejected ink. In the FIG. 13, photograph PHa shows the flying state of the ink if the first drive waveform (I) is applied and printing is performed by a single drop method with 1 drop. Photograph PHb shows the flying state of the ink if the first drive waveform (I) is applied and printing is performed by a multi-drop method with 2 drops. Photograph PHc shows the flying state of the ink if the first drive waveform (I) is applied and printing is performed by a multi-drop method with 3 drops. Photograph PHd shows the flying state of the ink if the second drive waveform (II) is applied and printing is performed by a single drop method with 1 drop. Photograph PHe shows the flying state of the ink if the second drive waveform (II) is applied and printing is performed by a multi-drop method with 2 drops. Photograph PHf shows the flying state of the ink if printing is performed by a multi-drop method with 3 drops in which the first drive waveform (I) is applied and the first drop is ejected, and the second drive waveform (II) is subsequently applied and the second drop and the third drop are ejected.

As is clear from comparing the photographs PHa and PHd, the photographs PHb and PHe, and the photographs PHc and PHf, respectively, if the second drive waveform (II) is not applied, many satellites land on the recording medium apart from the main ink droplets, causing deterioration of print quality such as density unevenness and ghost images. On the other hand, if the second drive waveform (II) is applied, the generation of satellites can be almost entirely suppressed. Therefore, it is possible to improve the print quality without causing density unevenness and ghost images. Further, since the generation of ink mist is also suppressed, there is less concern that the printer 200 may malfunction.

In the embodiments described above, each time element of the holding time R't, the first weak contraction time Ht, the contraction time P't, and the second weak contraction time Wt is set according to the relationship of Equations (1) to (3) described above, respectively. As another embodiment, Equation (1) may have instead the relationship of Equation (4) below:

$$Ht=Rt+(0.4\text{ to }0.6)$$

Equation (4) can be expressed in alternative notation as: $Rt+0.4 \leq Ht \leq Rt+0.6$. Thus, according to Equation (4), the time R't of the holding section corresponding to time period R' from the second drive waveform (II) may be set to zero. Even with such a drive waveform, by adjusting values of each of the first weak contraction time Ht, the contraction time P't, and the second weak contraction time Wt, it is still possible to suppress the amount of satellites accompanying the ink droplets ejected from the nozzle.

In the case of a multi-drop method in which one printed dot (1 dot) is formed by three ejected drops (3 drops), the first drive waveform (I) can be used for the first drop, and the second drive waveform (II) can be used for the second and third drops. In some examples, the first drive waveform (I) may be used for the first and second drops, and the second drive waveform (II) may be used for the third drop. Such concepts are also equally applicable to a multi-drop method of four drops (4 drops) or more.

The first drive waveform (I) is not limited to that illustrated in FIG. 10. However, even when other drive waveform are adopted as the first drive waveform (I), it is possible to obtain the effect of suppressing the generation of small droplets such as satellites, ink mist, and the like by using the second drive waveform (II) for at least the ejection of the ink droplets of the final drop in a series of drops.

The head 100 is not limited to the shared wall type. The disclosure can also be applied to other types of piezo-type inkjet heads.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inkjet head, comprising:

a pressure chamber for ink;

a nozzle plate including a nozzle for ejecting ink from the pressure chamber;

an actuator configured to change a volume of the pressure chamber; and a drive circuit configured to drive the actuator according to a drive waveform, wherein the drive waveform includes:

an expansion portion that drives the actuator in an expansion direction expanding the volume of the pressure chamber, a first weak contraction portion after the expansion portion that drives the actuator in a contraction direction contracting the volume of the pressure chamber, a contraction portion after the first weak contraction portion that drives the actuator in the contraction direction by an amount greater than the first weak contraction portion, a second weak contraction portion after the contraction portion that drives the actuator in the contraction direction by an amount less than the contraction portion, and a holding portion between the expansion portion and the first weak contraction portion, the holding portion not driving the actuator in either the contracting direction or the expansion direction, wherein the drive waveform comprises a first droplet ejection operation and a second droplet ejection operation after the first droplet ejection operation, the holding portion, the first weak contraction portion, the contraction portion, and the second weak contraction portion are in the second droplet ejection operation, and a sum of a holding time of the holding portion and a first weak contraction time of the first weak contraction portion is greater than or equal to a holding time of a first droplet ejection operation holding portion plus 0.4 microseconds, but less than or equal to the holding time of the first droplet ejection operation holding portion plus 0.6 microseconds.

2. The inkjet head according to claim 1, wherein a second weak contraction time of the second weak contraction portion is greater than or equal to an expansion time of a first droplet ejection operation expansion portion minus 0.5 microseconds, but less than or equal to the expansion time of the first droplet ejection operation expansion portion plus 0.5 microseconds.

3. The inkjet head according to claim 2, wherein a contraction time of the contraction portion is equal to 4 times the expansion time of the first droplet ejection operation expansion portion minus the second weak contraction time and the sum of the holding time of the holding portion and the first weak contraction time.

4. The inkjet head according to claim 1, wherein the actuator comprises a piezoelectric material.

5. The inkjet head according to claim 1, further comprising:

a plurality of pressure chambers for ink, wherein the nozzle plate includes a nozzle for each of the plurality of pressure chambers.

6. The inkjet head according to claim 1, wherein the drive circuit includes a first power source line connected to a positive terminal of a first power source, a second power source line connected to a negative terminal of a second power source, and a ground line connected to a ground terminal connected to a negative terminal of the first power source and a positive terminal of the second power source.

7. The inkjet head according to claim 6, wherein the drive circuit further includes a plurality of switch elements, each switch element having at least one of a source or drain connected to one of the first power source line, the second power source line, or the ground line.

8. A drive circuit for driving an actuator of an inkjet head, the driving circuit supplying a drive waveform including:

an expansion portion that drives an actuator in an expansion direction for expanding the volume of a pressure chamber;

a first weak contraction portion after the expansion portion that drives the actuator in a contraction direction contracting the volume of the pressure chamber;

a contraction portion after the first weak contraction portion that drives the actuator in the contraction direction by an amount greater than the first weak contraction portion;

a second weak contraction portion after the contraction portion that drives the actuator in the contraction direction by an amount less than the contraction portion; and a holding portion between the expansion portion and the first weak contraction portion, the holding portion not driving the actuator in either the contracting direction or the expansion direction, wherein the drive waveform comprises a first droplet ejection operation and a second droplet ejection operation after the first droplet ejection operation, the holding portion, the first weak contraction portion, the contraction portion, and the second weak contraction portion are in the second droplet ejection operation, and a sum of a holding time of the holding portion and a first weak contraction time of the first weak contraction portion is greater than or equal to a holding time of a first droplet ejection operation holding portion plus 0.4 microseconds, but less than or equal to the holding time of the first droplet ejection operation holding portion plus 0.6 microseconds.

9. The drive circuit according to claim 8, wherein a second weak contraction time of the second weak contraction portion is greater than or equal to an expansion time of a first droplet ejection operation expansion portion minus 0.5 microseconds, but less than or equal to the expansion time of the first droplet ejection operation expansion portion plus 0.5 microseconds.

10. The drive circuit according to claim 9, wherein a contraction time of the contraction portion is equal to 4 times the expansion time of the first droplet ejection operation expansion portion minus the second weak contraction time and the sum of the holding time of the holding portion and the first weak contraction time.

11. A method for driving an actuator of an inkjet head, the method comprising:

applying a drive waveform from a drive circuit to an actuator, the drive waveform including:

an expansion portion that drives the actuator in an expansion direction expanding the volume of a pressure chamber, a first weak contraction portion after the expansion portion that drives the actuator in a contraction direction contracting the volume of the pressure chamber, a contraction portion after the first weak contraction portion that drives the actuator in the contraction direction by an amount greater than the first weak contraction portion, a second weak contraction portion after the contraction portion that drives the actuator in the contraction direction by an amount less than the contraction portion, and a holding portion between the expansion portion and the first weak contraction portion, the holding portion not driving the actuator in either the contracting direction or the expansion direction, wherein the drive waveform comprises a first droplet ejection operation and a second droplet ejection operation after the first droplet ejection operation, the holding portion, the first weak contraction portion, the contraction portion, and the second weak contraction portion are in the second droplet ejection operation, and a sum of a holding time of the holding portion and a first weak contraction time of the first weak contraction portion is greater than or equal to a holding time of a first droplet ejection operation holding portion plus 0.4 microseconds, but less than or equal to the holding time of the first droplet ejection operation holding portion plus 0.6 microseconds.

12. The method according to claim 11, wherein a second weak contraction time of the second weak contraction portion is greater than or equal to an expansion time of a first droplet ejection operation expansion portion minus 0.5 microseconds, but less than or equal to the expansion time of the first droplet ejection operation expansion portion plus 0.5 microseconds.

13. The method according to claim 12, wherein a contraction time of the contraction portion is equal to 4 times the expansion time of the first droplet ejection operation expansion portion minus the second weak contraction time and the sum of the holding time of the holding portion and the first weak contraction time.

14. The method according to claim 11, wherein the actuator comprises a piezoelectric material.

* * * * *